Figure 1:
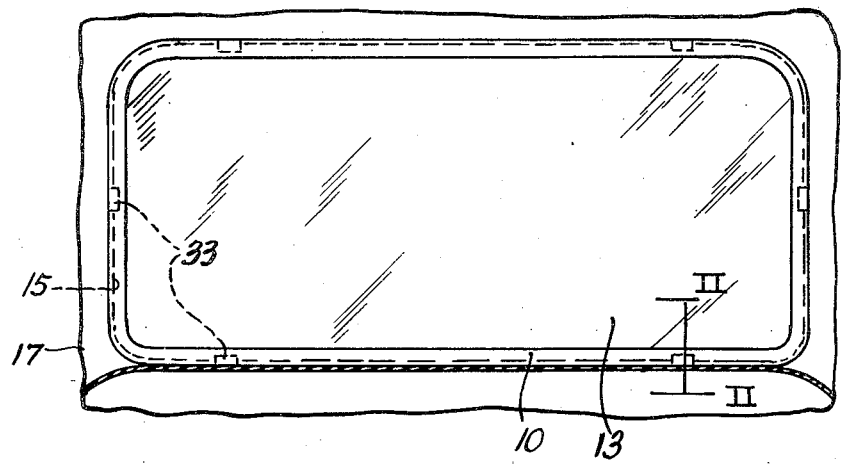

Oct. 28, 1941.   J. H. SHERTS   2,261,038
WINDOW PANEL MOUNTING
Filed Feb. 23, 1940

INVENTOR
JAMES H. SHERTS
BY Olew E. Bee
ATTORNEY.

Patented Oct. 28, 1941

2,261,038

UNITED STATES PATENT OFFICE 2,261,038

WINDOW PANEL MOUNTING

James Hervey Sherts, Pittsburgh, Pa., assignor to Pittsburgh Plate Glass Company, Allegheny County, Pa., a corporation of Pennsylvania Application February 23, 1940, Serial No. 320,400

3 Claims. (Cl. 296—84)

This invention relates to window panel mounting and it has particular relation to a mounting of automobile windows, such as windshields, or like transparent panels.

One object of the invention is to provide a construction of glass and window frame designed to reduce strain upon glass to a minimum and thereby prevent glass breakage.

Another object of the invention is to provide an improved yieldable mounting until combined with a glass panel and connections to an automobile frame or like glazed unit.

In the construction of automobile bodies, especially in connection with the installation of glass windows, or windshield panels, there has been considerable breakage as a result of binding of the glass too tightly against irregularities in the surrounding body frame. A so-called fence in conventional body structure is in the form of a flange or projection of metal around the window opening and this fence serves as a retaining element to prevent lateral movement of the glass and molding members in the assembled body.

It is desirable to have the glass mounted as firmly as possible to provide an arrangement which is proof against entry as well as proof against physical pressures from the inside of the body.

In one arrangement of the invention, there is provided a support for the glass wherein the latter is mounted in substantially floating relation in rubber or other yieldable material and wherein the glass is disposed adjacent the outer side of the projection or fence surrounding the body opening in which the glass is mounted. Positive connection with the body can be effected by means of clips or fasteners which are adapted to be rigidly secured directly to the body of the vehicle in front of the fence, or adapted to be hooked, or otherwise fastened upon the rear side of the fence. In a construction of this character in which safety glass is employed, the clips and rubber strip retaining member are sufficiently strong to resist displacement of the windshield to the extent that the latter will be broken before it is displaced. On the other hand, after the safety glass has been broken, the edges of the glass in the rubber retaining strip can be tilted and easily withdrawn, or in the process of breaking, after the glass has been disrupted outwardly, the glass pieces will be dislodged automatically from the retaining strip. This feature is of great importance with reference to safety because in pushing the glass outwardly in case the upper portion of a passenger is thrown against the windshield with sufficient force to break the latter, the glass will yield to the impact and the rubber strip will not retain broken fragments by which the passenger can be injured.

Figure 2:
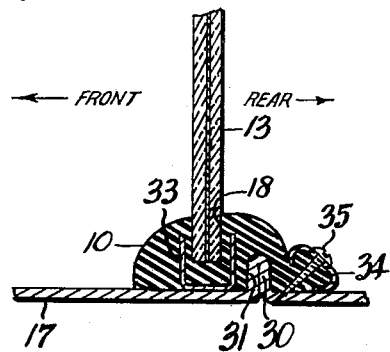
Figure 3:
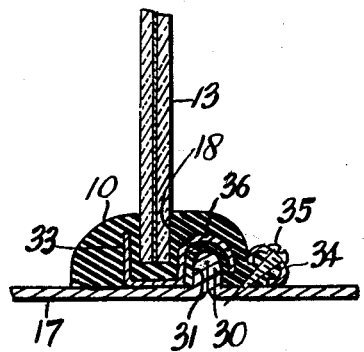
Figure 4:
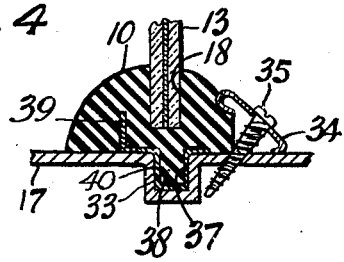

In the drawing:

Figure 1 is a fragmentary front elevation of a transparent panel mounted in a body frame; Fig. 2 is a vertical section, on a larger scale, taken substantially along the line II—II of Fig. 1; and Figs. 3 and 4 are vertical sections similar to Fig. 2 of additional and related forms of mounting.

In practicing the invention, a rubber molding or retaining strip 10 of such firmness as to be capable of resisting ordinary forces exerted upon a window panel 13, such as a windshield, supports the panel in an opening 15 in a vehicle body 17, and is sufficiently yieldable to provide adequate cushioning properties. Each edge portion of the window panel is forced snugly into a channel 18 formed in the body of the retaining strip which extends entirely around the four edges of the panel.

In this type of body, a flange or fence 30 is provided in the body wall and the rubber retaining strip is formed with a channel 31 on the side thereof opposite the channel 18. The retaining strip is pressed upon the flange in such manner that it is forced into the channel 31. It should be noted that the channels 18 and 31 open in substantially opposite directions and are offset forwardly and rearwardly with respect to each other. After the retaining strip and panel have been assembled upon the vehicle body, the fence 30 is disposed in offset relation to the panel (in this case a windshield), that is, with reference to the front and rear of the vehicle body, and the panel 13 is disposed forwardly or on the outer side of the fence 30.

Clips 33 of resilient metal are arranged at spaced locations along the length of the retaining strip 10 in embedded relation to the latter, and are substantially U-shaped in cross section. Each panel edge is disposed between the legs of the clips 33 and there is substantial thickness of the yieldable material of the retaining strip between the glass and legs of the clips. The combined strength of the clips 33 and rubber strip sustains the panel against accidental displacement even to the point of breaking the glass. Both sides of the panel, offset with respect to the clip legs are cushioned by the rubber material. These clips which are bedded in, or anchored in, the body of the retaining strip are rigidly secured by welding or otherwise to the body of the vehicle.

Fasteners in the form of metal garnish molding 34 and screws 35 can be provided adjacent of the rear or inner edge of the retaining strip and clamped thereagainst for securing such strip upon the vehicle body. When the screws are tightened in the vehicle body, the strip is forced against the rear or inner side of the fence 30. Clamping and binding pressures are, therefore, absorbed between the garnish molding and the fence 30, rather than against the glass panel.

In the form of construction shown in Fig. 3, the inner leg of the U-shaped clip is extended in the form of a hook 36 which overlaps or hooks behind the fence 30 on the inner side of the latter. In this arrangement, it is not necessary to weld or otherwise fasten the clip to the vehicle body. When forces are exerted against the inside or rear-side of the panel 13, the rubber retaining strip provides a yieldable and strong resisting medium and the clips 33 are also yieldable and further provide means to prevent forceable entry into the car through the window without breaking the latter. In this connection, it should be noted that the clamping action of the screws 35 and garnish strip 34 is exerted primarily against the fence rather than against the edges of the glass. Hence, the panel of glass is not subjected to excessive clamping and binding pressures.

In the arrangement shown in Fig. 4, a channel 37 is formed in the body 17 and its front wall 40 serves as a shoulder or fence against which the rubber strip can be clamped. The retaining strip 10 in this instance is provided with a rib 38 fitted into the channel 37 and the clip 33 has its forward leg extended in the form of a flange 39 overlapping in spaced relation the front edge of the panel. The action of the strip and panel in this instance is substantially the same as that previously described because the clamping action of the garnish molding 34 is transmitted through the rubber to the forward wall 40 rather than against the glass. It will be noted that the strip 10 in Fig. 4 is recessed on opposite sides of the rib 38 to facilitate the anchoring thereof against the shoulder or wall 40.

From this description, it will be apparent that the garnish molding 34 can be clamped against the rear side of the rubber strip with as much force as desirable without danger of breaking the panel or exerting undesirable strains thereon. On the other hand, the panel is yieldably mounted in such manner that it will be dislodged from the panel, in case of accident, as soon as it is broken, and yet from the outside it can not be removed intact from the channel without breaking the glass. The retaining strip can be considered as being divided into an inside or clamped section which is clamped under substantial pressure by the garnish molding against the shoulder portion of the body, and an outer section which is substantially free from clamping pressures and in which the glass panel is mounted in substantially floating relation.

Although practical construction has been shown and described as illustrative of the invention, it will be apparent to those skilled in the art that the invention is not so limited, but that various changes can be made therein without departing from the spirit of the invention or from the scope of the appended claims.

I claim:

1. In an automobile body construction having a window opening therein, a window panel disposed in the opening, a shoulder on the body extending about the edge of the panel and disposed in offset relation inwardly of the said panel edge, a rubber retaining strip having oppositely disposed recessed portions fitting upon the shoulder and panel edge, and members embedded in the retaining strip and secured to the body, portions of each member extending on the outer side of the panel edge in spaced overlapping relation thereto.

2. In an automobile body construction having a window opening therein, a window panel disposed in the opening, a shoulder on the body extending about the edge of the panel and disposed in offset relation inwardly of said panel edge, a rubber retaining strip having oppositely disposed recessed portions fitting upon the shoulder and panel edge, a clip embedded in the retaining strip and having a portion engaged behind the inner side of said shoulder, said clip having another portion engaged on the outer side of the panel edge to resist outward displacement of the panel.

3. In a vehicle body construction having a window opening therein, a window panel disposed in the opening and defining inside and outside areas with respect to said body, a rubber strip having a clamped section inside the body, means clamping said section under substantial pressure against the vehicle body, said strip having an outer section free from the clamping pressure and carrying the panel in substantially floating relation, and supplemental retaining means anchored in the body of said section and on said vehicle body outside the outer edge portion of said panel.

JAMES HERVEY SHERTS.